Feb. 27, 1923.

F. DANIELSON.
BURNING-IN AND RUNNING-IN MACHINE.
FILED MAY 8, 1920.

Inventor:
Frank Danielson
By: Gabel + Mueller Attys

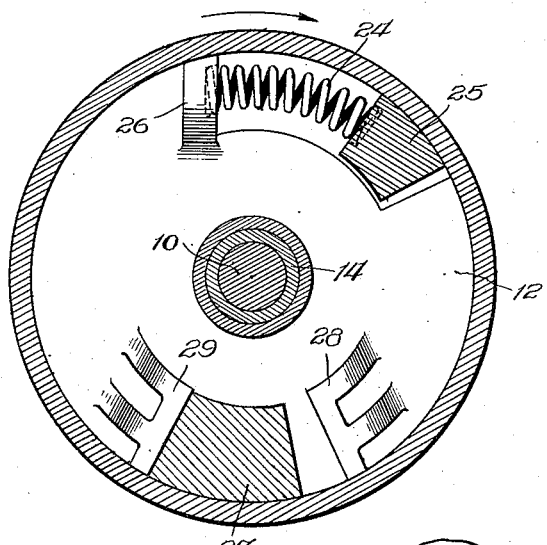
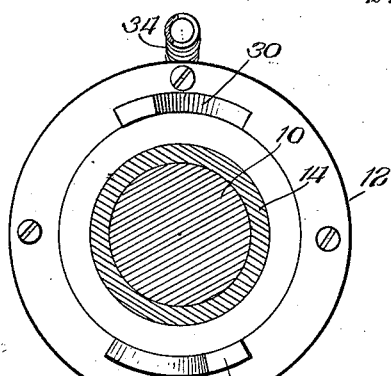
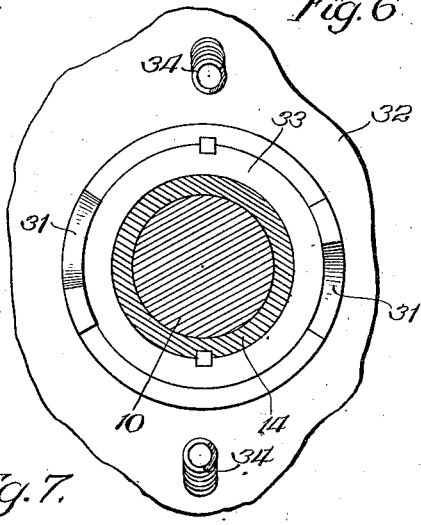
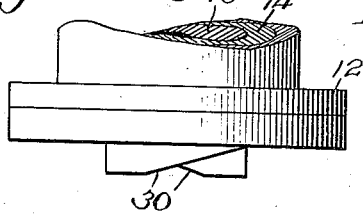
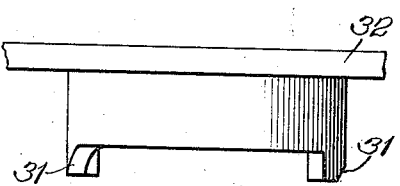

Patented Feb. 27, 1923.

1,446,838

UNITED STATES PATENT OFFICE.

FRANK DANIELSON, OF CHICAGO, ILLINOIS.

BURNING-IN AND RUNNING-IN MACHINE.

Application filed May 8, 1920. Serial No. 379,938.

*To all whom it may concern:*

Be it known that I, FRANK DANIELSON, a citizen of the United States, residing at Chicago, in the county of Cook and State of Illinois, have invented a certain new and useful Improvement in Burning-In and Running-In Machines, of which the following is a full, clear, concise, and exact description, reference being had to the accompanying drawings forming a part of this specification.

The object of this invention is to provide a machine of simple construction and efficient operation for burning-in the bearings of internal combustion engines and for running-in to limber the bearings and detect any oil leakage at the joints of the casing.

The invention also has for its object the provision of novel means for relieving the machine and the engine from excessive strains and shocks when power is initially applied in burning-in, and to start the rotation of the engine shaft in the bearings without damage to the machine or to the engine.

Further objects of the invention are to burn-in and run-in bearings uniformly to certain predetermined degrees; to start the burning-in operation and break loose the load, when the bearings are screwed down sufficiently, to give a perfect surface when the operations are completed, by an action resembling a hammer blow at the moment of applying the power which enables a small motor to be used, which avoids excessive strains, and which will prolong the life of the machine, the engine and equipment.

In the accompanying drawings illustrating a selected embodiment of the invention—

Fig. 3 is a transverse sectional view on the line 3—3 of Fig. 2;

Fig. 4 is a transverse sectional view on the line 4—4 of Fig. 2;

Fig. 5 is a top plan view of the parts shown in Fig. 4;

Fig. 6 is a transverse sectional view on the line 6—6 of Fig. 2; and

Fig. 7 is a top plan view of the parts shown in Fig. 6.

Figure 1:
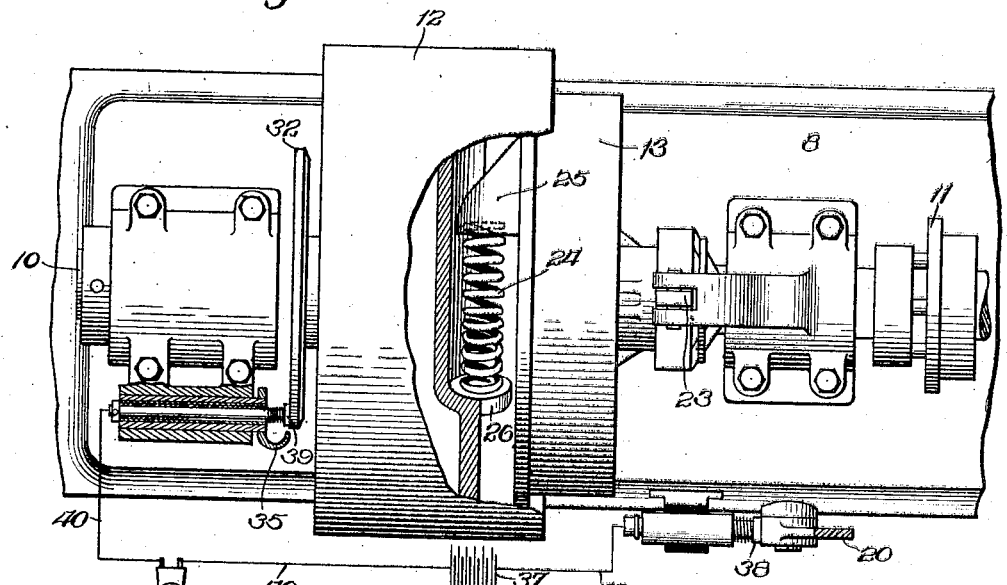
Fig. 1 is a top plan view partly in section.

Referring to the drawings, 8 indicates a bed frame having two uprights 9 in which the shaft 10 is rotatably mounted. This shaft is adapted to be engaged by means of suitable coupling devices 11 with the end of an engine shaft (not shown) to drive the latter. A suitable clutch is provided for connecting the driving pulley 12 and the shaft 10 and in the drawings I have shown a form of enclosed clutch comprising a shell 13 carried by a sleeve 14 loose on the shaft. A plurality of clutch jaws 15 are guided in a support 16 carried by a sleeve 17 which is keyed to the shaft, and a sliding sleeve 18 mounted on the sleeve 17 is adapted to operate the clutch shoes through toggle connections 19. The clutch sleeve is adjusted lengthwise on the sleeve 17 by an operating lever 20 connected with the clutch sleeve through the arm 21 and links 22, 23. It will be noted that the shell 13, 14 constitutes the driving member of the clutch and the parts 15 to 18 inclusive, constitute the driven expanding member of the clutch whereby power is communicated from the pulley 12 to the shaft 10.

In the construction and assembly of internal combustion engines, especially for automobiles and motor trucks, it is a more or less general practice at the present time to arrange the partly assembled engine in a suitable machine, to screw down the bearings sufficiently to provide a perfect working surface when the burning-in and running-in operations are completed, then to operate the engine shaft at a comparatively low rate of speed to burn-in the bearings to a proper fit, after which the engine is completely assembled and rearranged in the machine and the engine shaft again operated in oil to limber the bearings and discover any oil leakage. When the bearings are thus tightly clamped upon the shaft it will be apparent that the shaft will stick therein upon initial application of the power and in the absence of any corrective means the machine and the engine will be subjected to unusual and excessive strains which are apt to do more or less damage.

My invention seeks to take advantage of the principle of the hammer blow for releasing the shaft from the bearings upon initial application of the power to relieve the machine and the engine of shock and strain and to prevent the belt from slipping on the pulley. A spring 24 is interposed between a lug 25 on the clutch shell and a lug 26 on the pulley, and a lug 27 on the clutch shell is arranged between stop lugs 28, 29 on the pulley, the lugs 27, 28, 29 being preferably disposed substantially opposite to the lugs 25, 26 and the interposed spring 24. Power is applied to the pulley through a belt (not shown) from any suitable source and the pulley and the clutch shell, constituting one member of the clutch, revolve freely upon the shaft until the other member of the clutch, is thrown in by operating the lever 20. If the bearings of the internal combustion engine have been tightly clamped upon the engine shaft a very great amount of power is ordinarily required to break loose the load on the bearings, the exact amount depending upon the fit of the bearings on the engine shaft, when the clutch is thrown in, but with my invention the torque communicated through the pulley is applied gradually through the clutch to the shaft 10 and the engine shaft until the hammer blow takes place and between the throwing-in of the clutch and the full speed operation of the shaft 10 an interval of time elapses during which the stress is comparatively slowly increased on the engine shaft to aid in breaking loose the load thereon, until the hammer blow is applied, this completing the breaking loose of the load on the shaft.

These results are accomplished by interposing one or more relief springs 24 between stop lugs on the driving clutch member and the pulley which enable the pulley to continue its full speed operation while the clutch is coming up to this full speed by degrees. When power is first applied the lug 26 approaching lug 25 compresses spring 24 to yieldingly apply the torque to the engine shaft and then suddenly lug 27 on the clutch shell strikes lug 28 on the pulley member with a smart hammer blow which breaks loose the engine shaft from the load created by the clamped bearings and starts the shaft rotating.

Figure 2:
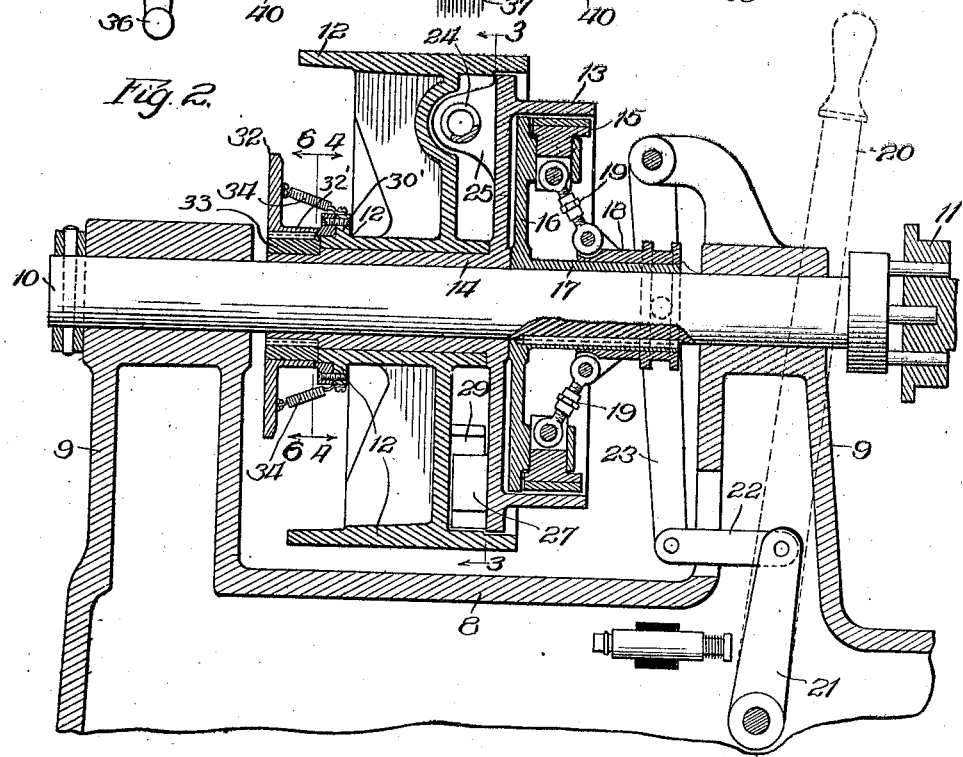
Fig. 2 is a vertical sectional view.

To give a signal when the operation is completed I provide cams 30 on ring 30' secured to the pulley hub and adapted to engage cams 31 on hub 32' of an indicator member 32 which is keyed to a collar 33 keyed upon the sleeve 14 of the driving clutch member whereby the indicator member is movable longitudinally of the shaft 10. Springs 34 are fastened to the indicator member and to the pulley to hold the indicator member in position for its cams 31 to engage the cams 30 on the pulley. Any suitable device may be employed to be operated by the indicator member for indicating that the burning-in or the running-in operation has been completed, and when thus warned the operator will immediately stop the machine, thereby insuring uniformity of the work. In the construction shown I provide an arm 35 positioned in such relation to the indicator member that an operator can readily tell by the position of the indicator member relative to the arm when the operation is completed. I also provide in connection with the arm 35, or as a separate signal, a simple electric bell indicator which comprises an alarm bell 36, a battery 37, a spring-pressed contact 38 adapted to be engaged by the clutch control lever 20, and another spring-pressed contact 39 adapted to be engaged by the indicator member 32. A conductor 40 leads from the contact 38 through the battery 37 and bell 36 to the contact 39. The contacts are insulated from the frame on which they are mounted in any suitable position and in any suitable manner. The contact 38 is preferably located at a distance from the control lever so that the indicator or signal circuit will not be closed until at or about the completion of the whole throwing-in stroke of the control lever. As the operation continues to completion and the load resistance decreases spring 24 will gradually expand and permit relative movement of the pulley and the clutch member until the indicator member 32 has been moved outward, to the left in Figs. 1 and 2, by engagement of cams 30 and 31, thus indicating that the operation is completed by its position relative to the arm 35, or by engagement with contact 39, closing the electric circuit and ringing the bell, it being of course understood that the return of the circuit is through the metallic parts of the machine from the member 39 to the member 38.

My invention is very simple in construction, it comprises comparatively few parts and it operates efficiently and automatically to burn-in and to run-in engine bearings. It provides for overcoming the dead load on the engine shaft due to the clamped bearings in a simple and effective manner which relieves the machine and the engine of shock and strains and it automatically indicates when the operation is completed so that the work may be done uniformly without special skill.

Changes in the form, proportion and arrangement of parts may be made in the machine for various purposes and for various reasons and I would have it understood that I reserve the right to make all such changes as fairly fall within the scope of the following claims.

I claim:

1. In a machine of the character described, the combination of a bed frame, a shaft mounted thereon, a driving pulley mounted to revolve freely on the shaft, a clutch on the shaft to communicate power from the pulley to the shaft and comprising a driving member, a spring to form an operative connection between the pulley and the driving member and cooperating means on said pulley and said clutch to impart a sudden impact to said shaft.

2. In a machine of the character described, the combination of a bed frame, a shaft mounted thereon, a driving pulley mounted to revolve freely on the shaft, a clutch on the shaft to communicate power from the pulley to the shaft and comprising a driving member, a lug on the driving member, a lug on the pulley, a spring interposed between said lugs and cooperating means on said pulley and said clutch to impart a sudden impact to said shaft.

3. In a machine of the character described, the combination of a bed frame, a shaft mounted thereon, a driving pulley mounted to revolve freely on the shaft, a clutch on the shaft to communicate movement from the pulley to the shaft and comprising a driving member, a spring interposed between said pulley and driving member, lugs on the pulley, and a lug on the driving member adapted to be engaged by one of the lugs on the pulley when the spring is compressed.

4. In a machine of the character described, the combination of a bed frame, a shaft mounted thereon, a driving pulley mounted to revolve freely on the shaft, a clutch to communicate power from the pulley to the shaft, cams on the pulley, an indicator, a member associated with said clutch, and cams on said member to cooperate with the cams on the pulley for moving said member longitudinally of the shaft to operate said indicator.

5. In a machine of the character described, the combination of a bed frame, a shaft mounted thereon, a driving pulley mounted to revolve freely on the shaft, a clutch to communicate power from the pulley to the shaft, cams on the pulley, an indicator, a member yieldingly connected with the pulley, and cams on the said member to cooperate with the cams on the pulley for moving said member longitudinally of the shaft to operate said indicator.

6. In a machine of the character described, the combination of a bed frame, a shaft mounted thereon, a driving pulley mounted to revolve freely on said shaft, a clutch to communicate power from the pulley to the shaft, cams on the pulley, an indicator, a member mounted to revolve with an element of said clutch and provided with cams to cooperate with the cams on the pulley to move said member longitudinally of said shaft, upon a relative rotational movement of said pulley and element to operate said indicator.

7. In a machine of the character described, a shaft, a pulley mounted to revolve freely thereon, a clutch member yieldingly connected with said pulley and communicating power to said shaft, an indicator, a member mounted for rotational movement with said clutch member and co-operating cams on said pulley and indicator whereby said member moves longitudinally of said shaft upon a relative rotational movement of said pulley and said clutch member to operate said indicator 8. In a machine of the character described, a shaft, a driving member rotating on said shaft, a driven member, a resilient connection between said members to impart rotation to said driven member, an indicator, a member mounted for rotation with said driven member and cooperating cams on said driving member and said member, whereby said member is moved longitudinally of said shaft upon the relative rotation of said driving and driven members to operate said indicator.

9. In a machine of the character described, a shaft, a member adapted to rotate on said shaft and means for transmitting power from said member to said shaft, comprising a member mounted to rotate with said shaft, a resilient connection between said members and a lug on said first member adapted to strike a stop on said last member to impart a sudden impact to said shaft.

10. In a machine of the character described, a shaft, a member adapted to rotate on said shaft and means for transmitting power from said member to said shaft, comprising a member mounted to rotate with said shaft, a compression spring forming a drive between said members and a lug on said first member adapted to strike a stop on said last member to impart a sudden impact to said shaft when said spring is partially compressed.

11. In a machine of the character described, a shaft, a member adapted to rotate on said shaft and means for transmitting power from said member to said shaft, comprising a member mounted to rotate with said shaft, a connection between said members providing for relative rotation between said members and a lug on said first member adapted to strike a stop on said last member to impart a sudden impact to said shaft after limited relative rotation of said members.

In witness whereof, I hereunto subscribe my name this 4th day of May, A. D. 1920.

FRANK DANIELSON.